US010649747B2

(12) United States Patent
Voellmy

(10) Patent No.: US 10,649,747 B2
(45) Date of Patent: May 12, 2020

(54) COMPILATION AND RUNTIME METHODS FOR EXECUTING ALGORITHMIC PACKET PROCESSING PROGRAMS ON MULTI-TABLE PACKET FORWARDING ELEMENTS

(71) Applicant: Andreas Voellmy, Mountain View, CA (US)

(72) Inventor: Andreas Voellmy, Mountain View, CA (US)

( * ) Notice: Subject to any disclaimer, the term of this patent is extended or adjusted under 35 U.S.C. 154(b) by 206 days.

(21) Appl. No.: 15/330,539

(22) Filed: Oct. 6, 2016

(65) Prior Publication Data

US 2017/0102943 A1   Apr. 13, 2017

Related U.S. Application Data

(60) Provisional application No. 62/284,711, filed on Oct. 7, 2015.

(51) Int. Cl.
  *G06F 8/41*     (2018.01)
  *H04L 12/771*   (2013.01)
  *H04L 12/24*    (2006.01)
  *G06F 8/30*     (2018.01)

(52) U.S. Cl.
  CPC ............ *G06F 8/41* (2013.01); *H04L 41/0893* (2013.01); *H04L 45/56* (2013.01); *G06F 8/31* (2013.01); . *H04L 41/0803* (2013.01); *H04L 41/0813* (2013.01)

(58) Field of Classification Search
  CPC .................................................. G06F 8/30–52
  See application file for complete search history.

(56) References Cited

U.S. PATENT DOCUMENTS

| 2013/0163427 A1* | 6/2013 | Beliveau ............... H04L 67/327 370/235 |
| 2014/0160984 A1* | 6/2014 | Hallivuori ........... H04L 41/0803 370/254 |

(Continued)

FOREIGN PATENT DOCUMENTS

WO   WO2016/038139   3/2016

OTHER PUBLICATIONS

Unified POF Programming for Diversified SDN Data Plane Devices Haoyu Song, Jun Gong, Hongfei Chen, Justin Dustzadeh (Year: 2015).*

(Continued)

*Primary Examiner* — Emerson C Puente
*Assistant Examiner* — Paul V Mills
(74) *Attorney, Agent, or Firm* — Richard Voellmy

(57) ABSTRACT

The invention pertains to a method of implementing packet-processing devices on multi-table datapath processors, comprising of a high-level, Turing-complete programming language that permits programmers to express time-invariant or time-variant packet-processing behavior using general-purpose programming languages, suitable compilation and analysis methods to transform a given input program into a datapath design, and a runtime control program to be executed on a general-purpose processor which can communicate with a configurable datapath element and which configures the datapath element according to the compiled datapath design and which implements appropriate dynamic control (e.g. flow table population) for the configured datapath element.

13 Claims, 10 Drawing Sheets

(56) References Cited

U.S. PATENT DOCUMENTS

| | | | | |
|---|---|---|---|---|
| 2014/0280893 A1* | 9/2014 | Pfeifer | .................... | H04L 43/04 709/224 |
| 2015/0277882 A1* | 10/2015 | Pongracz | ................ | H04L 45/38 717/167 |
| 2016/0050117 A1 | 2/2016 | Voellmy et al. | | |
| 2016/0062746 A1* | 3/2016 | Chiosi | ....................... | G06F 8/35 717/104 |
| 2016/0094395 A1* | 3/2016 | Hu | ........................ | H04W 28/16 370/254 |
| 2017/0093707 A1* | 3/2017 | Kim | ........................ | H04L 69/22 |

OTHER PUBLICATIONS

Forwarding Programming in Protocol-Oblivious Instruction Set Jingzhou Yu, Xiaozhong Wang, Jian Song, Yuanming Zheng, Haoyu Song# (Year: 2014).*

The Case for an Intermediate Representation for Programmable Data Planes Muhammad Shahbaz and Nick Feamster (Year: 2015).*

P4: Programming Protocol-Independent Packet Processors P. Bosshart, D. Daly, G. Gibb, M. Izzard, N. McKeown, J. Rexford, C. Schlesinger, D. Talayco, A. Vahdat, G. Varghese, & D. Walker (Year: 2014).*

Languages for Software-Defined Networks Nate Foster, Michael J. Freedman, Arjun Guha, Rob Harrisonz, Naga Praveen Katta, Christopher Monsanto, Joshua Reich, Mark Reitblatt Published: 2013.*

Towards Automatic Generation of Multi-table Datapath from Datapath-Oblivious Algorithmic SDN Policies Andreas Voellmy Y. Richard Yang Xiao Shi Published: Jan. 30, 2015 (Year: 2015).*

A Router Primitive Approach for Building Diverse Network Services Joel Sommers, Paul Barford, Ben Liblit (Year: 2012).*

Andreas Richard Voellmy, Programmable and Scalable Software-Defined Networking Controllers, May 31, 2014, XPD55239180, Yale University, ISBN: 978-1-321-06355-4.

Andreas Voellmy et al. "Maple", SIGCOM, ACM, 2 Penn Plaza, Suite 701 New York, NY 10121-0701 USA, Aug. 27, 2013, XP058030647, DOI: 10.1145/2486001.2486030.

* cited by examiner

| | Match | Action |
|---|---|---|
| Table 1 | $macSrc = a_1$ | $reg_{srcSw} = y_1$, Jump 2 |
| | ... | ... |
| | $macSrc = a_n$ | $reg_{srcSw} = y_n$, Jump 2 |
| | otherwise | $reg_{srcSw} = null$, Jump 2 |

| | Match | Action |
|---|---|---|
| Table 2 | $reg_{srcSw} = y_1, macDst = a_1$ | $output = o_{1,1}$ |
| | ... | ... |
| | $reg_{srcSw} = y_1, macDst = a_n$ | $output = o_{1,n}$ |
| | $reg_{srcSw} = y_2, macDst = a_1$ | $output = o_{2,1}$ |
| | ... | ... |
| | $reg_{srcSw} = y_k, macDst = a_n$ | $output = o_{k,n}$ |

FIG. 4

| | Match | Action |
|---|---|---|
| Table 1 | $macSrc = a_1$ | $reg_1 = y_1$, Jump 2 |
| | ... | ... |
| | $macSrc = a_n$ | $reg_1 = y_n$, Jump 2 |
| | otherwise | drop |

| | Match | Action |
|---|---|---|
| Table 2 | $macDst = a_1$ | $reg_2 = z_1$, Jump 3 |
| | ... | ... |
| | $macDst = a_n$ | $reg_2 = z_n$, Jump 3 |
| | otherwise | drop |

| | Match | Action |
|---|---|---|
| Table 3 | $reg_1 = y_1, reg_2 = z_1$ | $output = o_{1,1}$ |
| | ... | ... |
| | $reg_1 = y_1, reg_2 = z_n$ | $output = o_{1,n}$ |
| | $reg_1 = y_2, reg_2 = z_1$ | $output = o_{2,1}$ |
| | ... | ... |
| | $reg_1 = y_n, reg_2 = z_n$ | $output = o_{n,n}$ |

FIG. 5

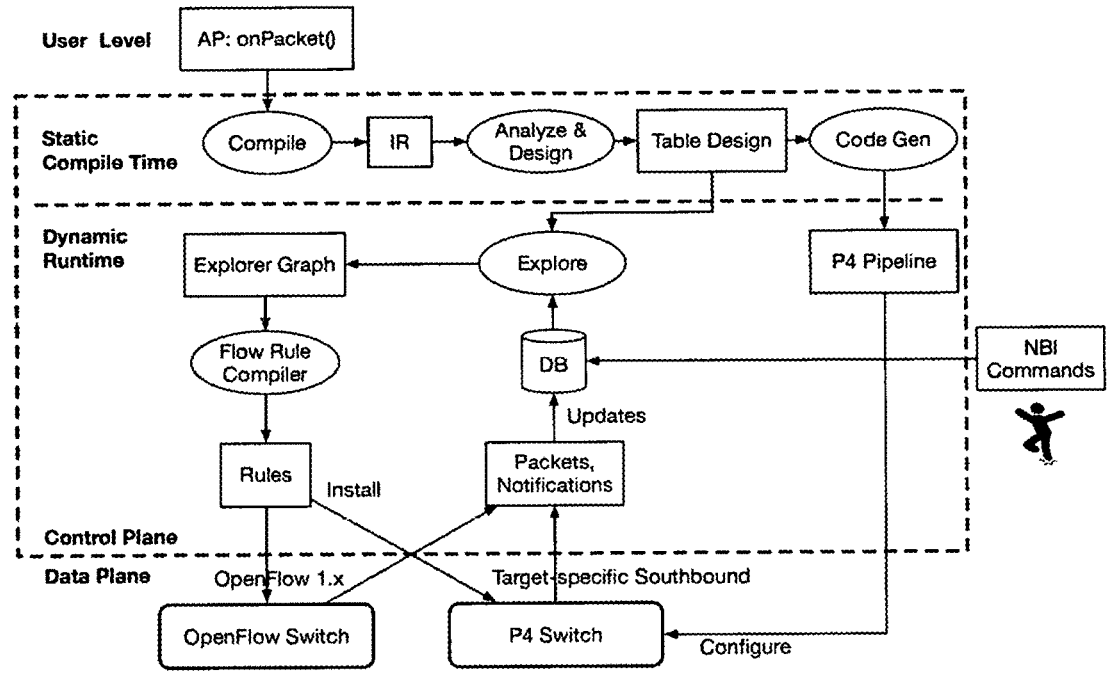

FIG. 6

| | Match | Action |
|---|---|---|
| Table 1 | $macSrc = a_1$ | $reg_s = a_1$, Jump 2 |
| | ... | ... |
| | $macSrc = a_n$ | $reg_s = a_n$, Jump 2 |

| | Match | Action |
|---|---|---|
| Table 2 | $reg_s = a_1$ | $reg_{srcSw} = y_1$, Jump 3 |
| | ... | ... |
| | $reg_s = a_n$ | $reg_{srcSw} = y_n$, Jump 3 |
| | otherwise | $reg_{srcSw} = null$, Jump 3 |

| | Match | Action |
|---|---|---|
| Table 3 | $macDst = a_1$ | $reg_d = a_1$, Jump 4 |
| | ... | ... |
| | $macDst = a_n$ | $reg_d = a_n$, Jump 4 |

| | Match | Action |
|---|---|---|
| Table 4 | $reg_d = a_1$ | $reg_{dstSw} = y_1$, Jump 5 |
| | ... | ... |
| | $reg_d = a_n$ | $reg_{dstSw} = y_n$, Jump 5 |
| | otherwise | $reg_{dstSw} = null$, Jump 5 |

FIG. 7

Table 1 (source group)

| Match | Action |
|---|---|
| $inPort: p_1, macSrc = a_1$ | $reg_1 = sg_1$, Jump 2 |
| ... | ... |
| $inPort: p_1, macSrc = a_n$ | $reg_1 = sg_n$, Jump 2 |
| otherwise | punt |

Table 2 (destination group and output port)

| Match | Action |
|---|---|
| $macDst = a_1$ | $reg_2 = dg_1$, $reg_3 = q_1$, Jump 3 |
| ... | ... |
| $macDst = a_n$ | $reg_2 = dg_n$, $reg_3 = q_n$, Jump 3 |
| otherwise | drop |

Table 3 (unicast output)

| Match | Action |
|---|---|
| ... | ... |
| $reg_1 : sg_i, reg_2 : dg_j, tcpSrc : w_k$ | drop or $output = reg_3$ |
| $reg_1 : sg_i, reg_2 : dg_j, tcpDst : w_k$ | drop or $output = reg_3$ |
| ... | ... |

FIG. 13

| System | Hosts | Rules | Time (s) | Med RTT(ms) |
|---|---|---|---|---|
| Maple | 70 | 4767 | 51 | 2.0 |
| POX | 70 | 18787 | 96 | 9.7 |
| Floodlight | 70 | 4699 | 37 | 2.1 |
| OpenDaylight | 70 | 4769 | 32 | 0.6 |
| Pyretic | 70 | - | > 1500 | |
| Magellan | 70 | 142 | 25 | 0.3 |
| Maple | 140 | - | - | |
| POX | 140 | 13107 | 389 | 11.9 |
| Floodlight | 140 | 16451 | 200 | 6.1 |
| OpenDaylight | 140 | 19349 | 150 | 1.2 |
| Pyretic | 140 | - | - | |
| Magellan | 140 | 282 | 123 | 0.6 |

FIG. 14

COMPILATION AND RUNTIME METHODS FOR EXECUTING ALGORITHMIC PACKET PROCESSING PROGRAMS ON MULTI-TABLE PACKET FORWARDING ELEMENTS

FIELD OF THE INVENTION

The present disclosure relates to the field of Computer Networking. Specifically, the present disclosure addresses the problems of programming packet-processing devices, such as commonly occur in computer networks, using conventional as well as novel programming languages. The present disclosure furthermore considers the problem of implementing programming languages for programming packet-processing devices using compilers and runtime systems that are implemented entirely or in part on packet processing hardware (such as CPUs, Application-Specific Integrated Circuits (ASICs) or Field-Programmable Gate Arrays (FPGAs)) that implement restricted computational models, such as OpenFlow (O. N. Foundation. Openflow switch specification 1.4.0. Open Networking Foundation (online), October 2013.) or P4 (P. Bosshart, D. Daly, G. Gibb, M. Izzard, N. McKeown, J. Rexford, C. Schlesinger, D. Talayco, A. Vandat, G. Varghese, and D. Walker. P4: Programming protocol-independent packet processors. SIGCOMM Comput. Commun. Rev., 44(3):87-95, July 2014 and p4.org/spec/), oriented to packet processing applications.

Despite the emergence of multi-table pipelining as a key feature of next-generation SDN datapath models, there is no existing work that addresses the substantial programming challenge of utilizing multi-tables automatically. The present disclosure describes a collection of algorithms, organized into a comprehensive system, called Magellan, that addresses the aforementioned challenge. Introducing a set of novel algorithms based on static analysis, actual explorative execution, and incremental computing, Magellan achieves automatic derivation, population, and update of effective multi-table pipelines from a datapath-oblivious, high-level SDN program written in a general-purpose language.

Compared with existing automated methods of implementing high-level programming or policy languages for networking, the flow tables generated by the methods of the present disclosure use far fewer switch resources. The switch configurations generated by the methods of the disclosure are often competitive with designs produced by expert humans.

The methods of the disclosure comprise the first system that automatically synthesizes both multi-table pipelines and corresponding control programs from a single, high-level forwarding program written in a familiar, general-purpose, datapath-oblivious programming language. The disclosed methods supports both P4 and OpenFlow 1.3+ switches, achieving cross-platform portability for the state-of-art datapath packet processors.

BACKGROUND OF THE INVENTION

Multi-table pipelining has emerged as the foundation of the next generation SDN datapath models, such as recent versions of OpenFlow, RMT (P. Bosshart, G. Gibb, H. S. Kim, G. Varghese, N. McKeown, M. Izzard, F. Mujica, and M. Horowitz. Forwarding metamorphosis: Fast programmable match-action processing in hardware for sdn. In Proceedings of the ACM SIGCOMM 2013 Conference on SIGCOMM, SIGCOMM 2013, pages 99-110, New York, N.Y., USA, 2013. ACM.), and FlexPipe (R. Ozdag. Intel Ethernet Switch FM6000 Series—Software ware Defined Networking (www.Intel.com/content/dam/www/public/us/en/documents/white-papers/ethernetswitch-fm6000-sdn-paper.pdf). By avoiding key problems such as unnecessary combinatorial explosions, multi-table pipelining can substantially reduce datapath table sizes, and is therefore essential for making SDN practical. At the same time, the introduction of multi-tables also adds additional SDN programming tasks including designing effective layout of pipelines, populating the content of multiple tables, and updating multiple tables consistently when there are changes. These tasks add substantial burdens for SDN programmers, leading to lower programming productivity. Automating these tasks can substantially simplify SDN programming.

Although there is previous work on how to use multi-table datapath (e.g., P. Bosshart, D. Daly, G. Gibb, M. Izzard, N. McKeown, J. Rexford, C. Schlesinger, D. Talayco, A. Vandat, G. Varghese, and D. Walker. P4: Programming protocol-independent packet processors. SIGCOMM Comput. Commun. Rev., 44(3):87-95, July 2014 and C. Schlesinger, M. Greenberg, and D. Walker. Concurrent Netcore: From Policies to Pipelines. In Proceedings of the 19th ACM SIGPLAN International Conference on Functional Programming, ICFP 2014, pages 11-24, New York, N.Y., USA, 2014. ACM.), this work still requires the programmer to specify detailed forwarding pipelines, including, for each flow table to be used in the program, the fields which it can match, the form of the matching, whether to use priorities or not, and a graph describing dependencies between the processing order that tables must occur in.

On the other hand, the algorithmic policy (AP) programming model provides a dramatically simplified network programming abstraction. In particular, an algorithmic policy consists of an ordinary algorithm, expressed in a conventional, Turing-complete, computational programming language that describes the functional input-output behavior of a network function without referencing implementation details related to tables, matches, actions, and other low-level constructs that are introduced in mapping such programs into network processing computing devices, such as various Application-Specific Integrated Circuits (ASICs) or Field-Programmable Gate Arrays (FPGAs). An algorithmic policy only specifies the functional input-output behavior defined as a function that determines, for each input packet how the program will change its internal state and what packets should be emitted as a result. Using the algorithmic policies programming model, the user defines a function that is repeatedly executed on packets, taking packets in and producing some number of modified packets out. This may be represented by the block-diagram depicted in FIG. 1.

In order to execute on packets at high-throughput, packet forwarding systems include a datapath component, a dedicated computational element which implements a highly-specialized computational model which executes simple packet processing steps at a high rate, but lacks full generality (i.e. it is not Turing-complete). Since such systems must still execute more complex algorithms, such as shortest path computations used in various protocol implementations, which cannot be executed on the specialized datapath component, most packet processing systems comprise (at least) two high-level components: one is the aforementioned datapath and the other in the control element, which typically executes on a general-purpose CPU connected to the datapath element via a communication network (i.e. processor interconnect). In particular, since the AP programming model is Turing-complete, individual APs may include complex computations which cannot be executed solely on a datapath component. Therefore, in general, APs must be compiled into such a two-component system. FIG. 2 depicts such a system with a block diagram.

Other high-level programming abstractions for network programming have been proposed, however all of these severely restrict expressiveness, so that the programmer cannot write most programs of interest in the language. For example, the NetCore language (C. Schlesinger, M. Greenberg, and D. Walker. Concurrent Netcore: From Policies to Pipelines. In Proceedings of the 19th ACM SIGPLAN International Conference on Functional Programming, ICFP 2014, pages 11-24, New York, N.Y., USA, 2014. ACM) only allows a subet of time-invariant forwarding behavior to be expressed, while FlowLog (T. Nelson, A. D. Ferguson, M. J. G. Scheer, and S. Krishnamurthi. Tierless programming and reasoning for software-defined networks. In Proceedings of the 11th USENIX Conference on Networked Systems Design and Implementation, NSDI 2014, pages 519-531, Berkeley, Calif., USA, 2014. USENIX Association.) requires the computation of output ports for a given packet to be expressed in a form of Datalog that is not Turing-complete. Furthermore, to date, all systems implementing these restricted programming abstractions only use a single flow table, severely limiting their scalability and performance.

Previous work on implementing general algorithmic policies uses the method of *Trace Trees* (A. Voellmy, J. Wang, Y. R. Yang, B. Ford, and P. Hudak. Maple: Simplifying SDN Programming Using Algorithmic Policies. In Proceedings of the ACM SIGCOMM 2013 Conference on SIGCOMM, SIGCOMM 2013, pages 87-98. ACM, 2013.). This method has several disadvantages. First, the compilation uses only a single flow table. Second, the approach relies on a so-called reactive flow table population method wherein the switch rule table is treated as a cache and new rules are only inserted into the cache when an arriving packet is not matched in the cache and an authoritative controller, which implements the trace tree system, is consulted. This delay induced in diverting packets to consult a controller severely affects system performance.

What is needed are methods to automatically derive, populate, and update effective multi-table pipelines from datapath-oblivious algorithmic policies (AP) (A. Voellmy, J. Wang, Y. R. Yang, B. Ford, and P. Hudak. Maple: Simplifying SDN Programming Using Algorithmic Policies. In Proceedings of the ACM SIGCOMM 2013 Conference on SIGCOMM, SIGCOMM 2013, pages 87-98. ACM, 2013), where datapath-oblivious means that the programming language does not expose constructs regarding datapath-specific details such as flow tables, matches, actions, registers, and so on. The present disclosure focuses on the algorithmic policies model because it is highly general and flexible; hence it poses minimal constraints on SDN programming. On the other hand, effectively utilizing multi-table pipelines from algorithmic policies can be extremely challenging, because APs are expressed in a general-purpose programming language with arbitrary complex control structures (e.g., conditional statements, loops), and the control structures of APs can be completely oblivious to the existence of multi-tables. Hence, it is not clear at all whether one can effectively program multi-table pipelines from such APs. We refer to this as the oblivious multi-table programming challenge.

To illustrate the challenge of programming packet processing devices, we consider a simple, but representative example AP called L2-Route to illustrate the basic challenges and ideas. The AP performs routing using layer 2 addresses:

| | // Program: L2-Route |
|---|---|
| 1. | Map macTable(key: macAddress, value: sw) |
| 2. | onPacket(p): |
| 3. | s = p.macSrc |
| 4. | srcSw = macTable[s] |
| 5. | d = p.macDst |
| 6. | dstSw = macTable[d] |
| 7. | if (srcSw != null && dstSw != null) : |
| 8. | egress = myRouteAlg(srcSw, dstSw) |
| 9. | else |
| 10. | egress = drop |

In this example and throughout this document, we use the following AP abstraction: each packet p, upon entering the network at an ingress point, will be delivered to a user-defined callback function named onPacket, also referred to as the function $f$. This function sets the egress variable to be the path that the packet should take across the network. We refer to this style of returning the whole path as the global policy. A variation on this programming model is to define a local, per-switch onPacket function. The results will be similar.

Although L2-Route looks simple, it includes key components of a useful algorithmic policy: maintaining a system state variable, and processing each packet according to its attributes and the current state. Specifically, line 1 of L2-Route declares its state variable macTable: a key-value map data structure that associates each known L2 endpoint to its attachment switch. Given a fixed packet, L2-Route performs a lookup, using the macTable state variable, of the source and destination switches for the packet, and then computes a route between the two switches through the network.

Result of Current Tool:

The only current work that handles general algorithmic policies is Maple ((A. Voellmy, J. Wang, Y. R. Yang, B. Ford, and P. Hudak. Maple: Simplifying SDN Programming Using Algorithmic Policies. In Proceedings of the ACM SIG-COMM 2013 Conference on SIGCOMM, SIGCOMM 2013, pages 87-98. ACM, 2013), which uses a trace tree approach: a policy is repeatedly invoked within a tracing runtime system that records the sequence of packet attributes read by each invocation, and the recorded execution traces form a trace tree; a trace tree can be compiled to a single flow table, where each leaf of the tree corresponds to a rule in the flow table. FIG. 3 shows the resulting trace tree and the flow table required for L2-Route to support n hosts with MAC addresses 1 . . . n communicating with each other. For example, the bottom left result pi is the execution trace of a packet with macSrc 1 and macDst 1.

Despite its simplicity, this example illustrates well the issues of the trace tree approach. First, assume the program sees packets between each pair of endhosts stored in macTable. Then the trace tree has $n^2$ leaves, generating a flow table with $n^2$ rules. This, however, as we show below, is much larger than necessary. Second, even worse, assume a setting where packets with source or destination MAC not stored in macTable can appear (e.g., due to attacks). Then, the trace tree approach will still generate flow table rules for such packets. In a worst case where a large number of such packets appear, the trace tree approach may generate well above $n^2$ rules-in the limit, the trace tree can generate $2^{96}$ rules, resulting in a not resilient system.

Suboptimal Manual Table Design by Experts:

Since there are no existing tools to automatically generate multi-tables, we asked several experienced network professionals with significant SDN knowledge to design tables for L2-Route. We allowed experts to take advantage of datapath registers (aka metadata fields) that can be used to store state across tables, and which are available in several dataplane models, including OpenFlow and P4. We use notation $reg_x$ to denote a register holding values for program variable x. For the present discussion, we assume that data values can be written and read from registers by suitably encoding them into bit array representations.

We found that most experts chose a two-table design, as shown in FIG. 4, reasoning that the program performs two classifications, one on macSrc and the other on macDst and hence two table lookups suffice. The first table matches on macSrc to write an appropriate srcSw value into $reg_{srcSw}$. The second table also matches on the outcome of the first table (held in $reg_{srcSw}$) since this attribute also affects the desired outcome. If n is the number of hosts in the network and k the number of switches output by the macTable mapping, then the two-table design requires n+kn rules. Hence, this design successfully avoids the $n^2$ cross product problem, since the number of $reg_{srcSw}$ values is typically much lower than the number of host interfaces in the network.

While this design improves over the single table design generated by trace trees, it is suboptimal for most networks that have many more hosts than switches. In particular, the three table design shown in FIG. 5, which has a final table that matches on combinations of switches, typically requires far fewer rules. The three table design requires $2n+k^2$ rules, which compares favorably to the previously described two-table design. For a network with 4,000 hosts and 100 switches, the two-table design requires 404K rules while the three-table design requires 18K rules, a 22× difference.

The preceding discussion demonstrates that selecting good pipeline designs requires considering details such as the flow of data values through the given program (in order to determine the sizes of tables), which are difficult and tedious for humans to consider and easily overlooked.

Burden of Populating Tables with Rules:

In addition to designing a pipeline, a human expert is required to define how tables are populated with rules at runtime, which can be a complex task. Consider for example, how to generate new rules for the two-table design when a single, new entry (a', s') is inserted into macTable. If a' is a new key and s' is a value not previously occurring in the table, then Table 1 requires a new entry macSrc: a'→$reg_{srcSw}$: s' and Table 2 requires new entries of the form $reg_{srcSw}$: s', macDst: a→output: $o_{a,s'}$ for every key a of macTable. This illustrates that a single change to a high-level state may require changes in multiple flow tables.

Moreover, if L2-Route is modified in a minor way, the situation becomes more challenging:

```
2.      onPacket(p) :
3.        s = p.macSrc
4.        srcSw = macTable[s]
4a.       if srcSw member [1,2,3,4] :
4h.         egress = drop; return
5.        d = p.macDst
6.        dstSw = macTable[d]
```

In this version of L2-Route, the program drops packets from switches 1 through 4. In this case, it is unnecessary to continue processing packets from switches 1-4. In the two-table design, Table 2 need not match on values 1-4 for the $reg_{srcSw}$ field, which could lead to substantial saving of space when the number of hosts is large. Taking advantage of this in populating entries for Table 2 therefore requires reasoning about the flow of possible values to Table 2, which is a burden for programmers.

Burden of Target-Specific Programming:

In addition to the conceptual design of the forwarding pipeline and the runtime processes to populate the pipelines' rules, a programmer is faced with the substantial burden of encoding these designs into target-specific forwarding models. For example, when targeting Open vSwitch (openvswitch.org), a programmer may use the Nicira-extension registers to implement the datapath registers and populate entries using an OpenFlow protocol. On the other hand, when implementing the design with P4, the programmer would need to declare metadata structures and fields, and would need to use a target-forwarding-element-specific runtime protocol to populate rules in the P4 forwarding element. Since there is no existing portability layer that spans various OpenFlow and P4 switches, the high-level design and runtime algorithms will need to be coded multiple times for each supported target, leading to duplicated effort and increased likelihood of bugs. We use the term "southbound protocol" to refer to any protocol by a controller or other software to interact with a forwarding element to control or observe the forwarding element's behavior.

OBJECTS OF THE INVENTION

The high-level objective of the present disclosure is simple to state: alleviate the aforementioned burdens of table design, table population, and target-dependent programming, so that SDN programmers can focus on high-level, general-purpose, and target-independent programming.

The first goal of this disclosure is to provide a programming abstraction that has the following qualities:

Familiar: Constructs have ordinary semantics that are substantially similar to the semantics of widely-used, general-purpose scripting and application programming languages. There are no oddities, such as out of order execution or only integer variables.

Expressive All programs are supported; that is, the programming language supports arbitrary arithmetic expressions and state update operations.

Safe: Errors in low-level dataplane specification/config are removed.

Portable: The program is independent of southbound forwarding models and protocols.

The second goal of this disclosure is to efficiently implement the aforementioned programming abstraction on recent packet-processing computational models, with a compiler that produces a system with the following qualities:

Multi-tables & Registers: The system makes effective use of multiple flow tables and datapath registers, such as those provided in the RMT packet processor architecture.

Proactive: The system populates forwarding configurations (also known as rules) even in the absence of any information about actual traffic (such as sampled packets), when possible.

Supports Multiple Execution Targets The system can execute with a variety of packet processor architectures, such as RMT and FlexPipe, and their associated communication protocols, such as P4 and OpenFlow.

SUMMARY OF THE INVENTION

The term Magellan refers to the methods of the current disclosure.

One possible implementation strategy for Magellan is to implement complete compilation, similar to a setting that a modern compiler compiles a high level language completely to a target machine code; the compiler no longer needs to be available after compilation. This, however, is not possible in implementing packet-processing programs on datapath elements, since APs include computations which cannot be executed on specialized datapath components. This reveals fundamental differences between traditional compilation and Magellan compilation. Specifically, one difference between implementing programs using a network datapath element and the problem faced by traditional compilers is that general-purpose instruction sets can implement state update (i.e., modifying memory storing the state), but datapath flow tables cannot update states, except for simple state variables such as some counters. Hence, Magellan must (1) encode flow tables such that datapath packets that trigger state changes (e.g., an AP that checks if a packet contains a new MAC, and if so, adds it to a system state variable) should be forwarded back to the controller; and (2) Magellan must have an online runtime to carry out the update. Even beyond that, for APs that will not update system state, their computations may not be mapped practically. In particular, consider return p.macDst % n (i.e. the L2 destination address taken modulo n), where $n \neq 2^i$ for any i. There is no compact flow table representation of this statement, where a compact flow table is one who has far fewer than $2^{48}$ rules.

This result is not totally surprising, because flow tables in SDN provide a fundamentally limited computational model. Although one possibility to handle such cases is to restrict the language, Magellan makes the design decision of allowing general programming. Hence, although Magellan compiler will warn a programmer about such cases, it still allows the programmer to proceed if chosen by the programmer. Magellan generates flow tables with conditions to detect cases when such computations happen and send them back to the controller for execution, achieving a complete design.

A key design decision is whether to conduct table design for specific system state or whether to conduct table design once, for all possible system states. Note that the content of flow tables will depend on system state (subsequent examples will illustrate this point). The benefit of this approach is that the table designed is optimized for the system state. An issue of this approach, however, is that the system state of a network can change, due to policy state (e.g., ACL rules) or network status state (e.g., link status) changes. Many programmable forwarding devices, specifically those implementing P4, require a possibly time-consuming configuration step to specify table attributes (though not their contents) prior to operating on input traffic, prohibiting frequent runtime reconfiguration of the forwarding pipeline. Therefore, Magellan relies on a combination of static and dynamic analysis: static analysis based on program structure and stable system state statistics to design multi-table pipeline, and dynamic, runtime analysis based on exact system state to populate rule tables.

In summary, Magellan introduces four key components to efficiently implement algorithmic policies on both OpenFlow and P4 targets:

1. The first is the Analyzer, which converts programs written in a friendly, user-oriented language into a language- and target-independent Intermediate Representation (IR) of simple instructions and analyzes these programs to produce information, such as control- and data-flow graphs and variable liveness.
2. The second is the Table Designer, which uses the analyses produced by the Analyzer to produce a forwarding pipeline design consisting of table definitions, metadata information, and control flow among tables.
3. The third is the Explorer, the key runtime component that populates the flow tables designed by Table Designer based on actual runtime values, such as the particular values of program state variables.
4. The fourth is the Controller, which handles difficult-for-flow-table to handle instructions as well as interacts with specific target switches using their target-specific protocol and which translates the target-independent flow tables produced by Explorer into target-specific rules and commands.

FIG. 6 shows main Magellan components and the basic workflow targeting both OpenFlow and P4 switches. The static components analyze a user-specified AP program to obtain analysis artifacts such as variable liveness information, data flow and control flow graphs, and transform the provided AP into a table and datapath pipeline design. At runtime, the Magellan runtime connects with a device and, given the compiled datapath pipeline design and the device type, generates the appropriate target-specific code (the detailed code may vary as appropriate for different device manufacturers, etc.) and transmits the code to the datapath processor. At runtime, the exploration algorithm and rule compilation algorithms are repeatedly run as needed to populate runtime configurable elements of the generated pipeline design (such as rule entries of tables in the table design) in response to changes in state elements referenced by the AP. In addition, the generated system provides interfaces (so-called Northbound APIs (NBI)), such as a command-line interface (CLI) for use by human users and an application programming interface (API) for use by external programs to update the state elements referenced by the AP. For example, a human user or management system could use these interfaces to update IP tables, L2 tables, or Access-control lists (ACLs) referenced by the input AP. The database (DB) stores the current configuration (i.e. results of executing commands issued by NBI users) as well as the state of any AP state tables.

The following detailed disclosure describes and exemplifies the Analyzer, Table Designer and Explorer.

The disclosure accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the disclosure will be indicated in the claims.

BRIEF DESCRIPTION OF THE DRAWINGS

For a more complete understanding of the invention, reference is made to the following description and accompanying drawings, in which:

FIG. 4 shows two-table design for L2-Route commonly suggested by human experts;

FIG. 5 shows the optimized 3 table pipeline for L2-Route;

FIG. 6 shows Magellan major components and workflow;

FIG. 7 shows instruction-level memoization;

FIG. 13 shows the flow table design for Group-based Policy (GBP). The action in table 3 depends on the matching contract as described in the detailed disclosure;

FIG. 14 shows end-to-end performance comparison of several SDN controllers;

DETAILED DESCRIPTION OF THE PREFERRED EMBODIMENTS

Algorithmic Policy (AP):

Since different languages and different systems using the same language may impose different syntax to specify an AP, we do not give a formal specification of AP syntax. Instead, we use a pseudo-code style to specify APs in this disclosure. Different from low-level datapath computation models such as Openflow and P4, which typically allow only simple numerical types and limited computation flow control, a good language for APs should allow generic, compound data types (e.g., sets, hash maps) and complex computation flow control such as conditionals and loops.

Figure 1:
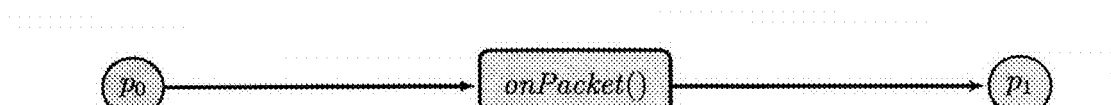
FIG. 1 shows the block diagram of a packet-processing algorithm or system.
Figure 2:
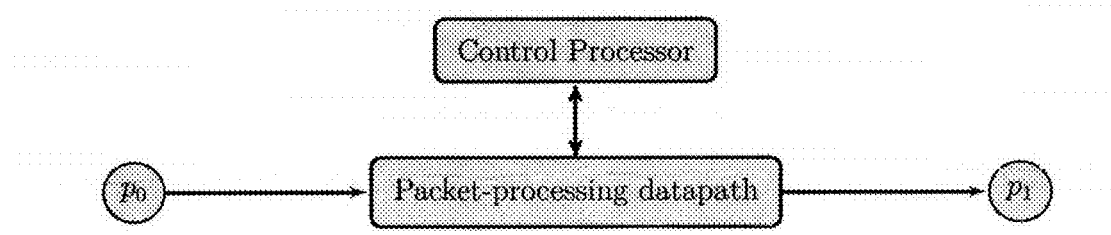
FIG. 2 shows the block diagram of a packet-processing system consisting of a specialized packet-processing datapath and a general purpose control processor implementing a runtime control algorithm.
Figure 3:
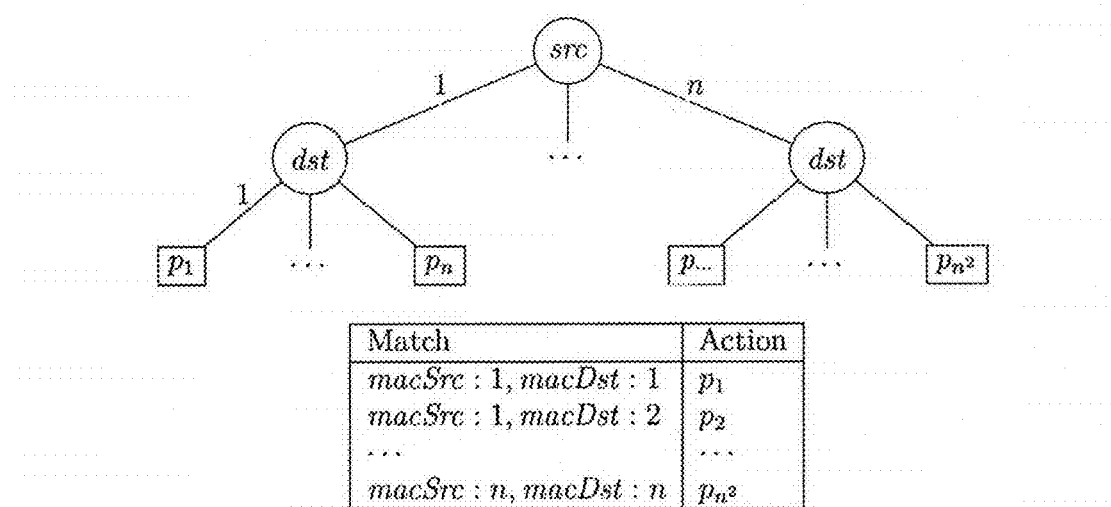
FIG. 3 shows the trace tree and flow table for L2-Route.

In Magellan, the user writes a function that processes packets in a language with familiar, algorithmic features like variables, loops, and data structures. Conceptually, the user defines a function that is repeatedly executed on packets, taking packets in and producing some number of modified packets out, as shown in the block diagram of FIG. 1.

To illustrate, the following is an example program that drops packets destined to some blacklisted IP prefixes, learns host location bindings, and forwards based on destination MAC address:

```
1   function onPacket( ) {
2       if (deny( )) {egress = [ ]; return; }
3       macTable[ethSrc] = ingressPort;
4       d = macTable[ethDst];
5       if (d == null) {
6           egress = members ports;
7       } else {
8           egress = [d];
9       }
10      return;
11  }
12  function deny( ) {
13      if (ethType != 0x0800) { return false; }
14      routes = members blacklist;
15      for (i = 0; i < len routes; i = i +1) {
16          route = routes[i];
17          if (ipDst in route.addr<route.len>) { return true; }
18      }
19      return false;
20  }
```

This program exhibits several features of the programming model:

Input: A set of distinguished input variables denoting values for packet fields and ingress info, such as ethSrc, ethDst, ingressPort.

Output: A set of distinguished output variables, such as egress, denoting the ports to which to send a packet.

State: User-defined state, (e.g. macTable, blacklist) which can be simple variables, sets, and maps, and can be accessed (e.g., line 4) and updated (e.g., line 3) by the packet handler.

Computation: Full arithmetic (add, multiply, modulo, . . . ), data structures such as lists and records (e.g., routes), variables, assignments, conditional, loops (line 15), function calls (line 2).

To appreciate the flexibility, generality, and complexity of APs, consider an AP for Group-based Policy (GBP) (Group-based Policy (GBP), wiki.opendaylight.org/view/Group_Policy:Architecture/OVS_Overlay#Packet_Processing_Pipeline) a substantial framework for specifying application policies in data centers in both OpenDaylight (OpenDaylight.opendaylight.org) and OpenStack (OpenStack.www.openstack.org). GBP policy (For brevity, we have simplified and removed some GBP details, such as optimized handling of Address Resolution Protocol (ARP) packets, extended action set, etc.) consists of a collection of endpoint groups (group). Each endpoint (aka network host) is assigned to one group, and each group participates in one or more contracts. Given a packet p, GBP checks if there exists a contract that is common to the packet sender's group's contracts and to the packet receiver's group's contracts. A matching contract consists of an ordered sequence of clauses. Whether a clause is enabled depends on conditions on packet source and packet destination, where the condition of an endpoint is a set of labels (e.g., virus_detected, authenticated, os_windows). An enabled clause leads to a set of rules, where each rule consists of both a packet classifier and a set of actions (e.g., permit).

Despite the preceding description complexity, implementing GBP using an AP is relatively straightforward. The following listing shows an AP, focusing on the case that GBP checks permit, and including code to do L2 learning and to compute the out port of the packet.

```
Map macTable(key:macAddress, value:port)
Map mac2Cond(key:macAddress, value:StringSet)
Map mac2Group(key:macAddress, value:int)
Map group2Contracts(key:int, value:[int])
...
def gbp(p):
  1.      srcCond = mac2Cond[p.macSrc]
  2.      dstCond = mac2Cond[p.macDst]
  3.      srcGrp = mac2Group[p.macSrc]
  4.      dstGrp = mac2Group[p.macDst]
  5.      if (srcGrp == null || dstGrp == null):
  6.          return false
  7.      sctrcts = contracts[srcGrp]
  8.      dctrcts = contracts[dstGrp]
  9.      if (sctrcts == null || dctrcts == null):
  10.         return false
  11.     for (scontract : sctrcts):
  12.         for (dcontract : dctrcts):
  13.             if (scontract == dcontract):
  14.                 // check clauses conditions ...
  15.         return false
def onPacket(p):
  1.      macTable[p.macSrc] = p.ingressPort
  2.      permit = gbp(p)
  3.      if (permit == false): egress=drop; return
  4.      d = macTable[p.macDst]
...
```

One can see that the GBP AP uses complex data structures as state variables. For example, mac2Cond maps a MAC address representing an endpoint host to a set of string labels representing its conditions. On the other hand, mac2Group is a relatively simpler state which maps a MAC address to the ID of a endpoint group that the endpoint belongs to. The GBP AP also uses complex control structures including conditionals at lines 5, 9, 13 of the gbp function and for loops at lines 11, 12. Note that different SDN programmers may design different data structures and different control structures. Some part of the program may be written inefficiently. What we show is just one possible input to Magellan.

AP Intermediate Representation (IR):

To avoid excessive source language dependence and to simplify the design of the system, Magellan maps an input AP into the following simple Intermediate Representation (IR) instruction set:

```
<instruction> ::= <ident> '=' <expr>
      | 'label' <label>
      | 'goto' <label>
      | 'cond' <booleanexpr> <label> <label>
      | 'return' <expr>
<expr> ::= 'arith' <arithexpr>
      | 'boolean' <booleanexpr>
      | 'call' <function-name> <expr-list>
      | 'readpktfield' <fieldexpr>
      | 'lookup' <mapident> <expr>
      | 'members' <mapidentifier> <expr-list>
      | 'update' <mapidentifier> <expr> <expr>
      | <etc>
```

The instructions in Magellan IR should be relatively easy to understand. To help with the understanding, the following listing shows the instructions that could be used to implement a segment (lines 1-5) of the aforementioned GBP AP listed above:

```
1. v1 = readpktfield macSrc
2. srcCond = lookup mac2Cond v1
3. v2 = readpktfield macDst
4. dstCond = lookup mac2Cond v2
5. srcGrp = lookup mac2Group v1
6. dstGrp = lookup mac2Group v2
7. cond srcGrp == null || dstGrp == null 8 9
8. ...
```

Table Design

We start with the basic insights of table design. Consider each IR instruction I. It can be modeled as a function that reads a subset of program variables, assigns new values to a subset of variables, and determines a new value for the program counter (an instruction address). We refer to the subset of program variables whose values are read by the instruction as its input variables, denoted inputs(I), and the subset of variables assigned to by I as its output variables, denoted outputs(I). The update instruction requires more careful modeling, so we postpone its discussion until later.

Hence, we model the semantics of each instruction I as a transition function, $\bar{I}$: Store→(PC, Store), where each element store $\in$ Store consists of an assignment $\{v_1 \mapsto a_1, \ldots, v_n \mapsto a_n\}$ of values $a_1, \ldots, a_n$ to program variables $v_1, \ldots v_n$ and pc$\in$PC is an address of an instruction occurring in the program. Packet attributes are among the variables $v_1 \ldots v_n$.

Given this semantic instruction model, we can develop a first simple approach to modeling subcomputations by modeling each instruction with a flow table that records the input-output semantics of the instruction. Specifically, each rule in the table for I will simulate the effect of executing I on a variable binding store: if $\bar{I}$(store)=(pc, store') then we can use a rule that matches the input variables to I against the values of those variables in store and which has an action that first writes to the variables changed by I to the values they take in store' and then jumps to the table for pc. To determine the set of store values that I may execute on, we can apply a reactive controller that observes the values of input variables at each table through a packet punt mechanism.

This aforementioned approach is called alternatively, the instruction-level memoization' or the per-instruction flow table technique.

FIG. 7 illustrates the instruction-level memoization approach applied to lines 3-6 of L2-Route. For example, table 2 models statement L4 by matching on the register for s and setting the register for srcSw. While the approach succeeds in avoiding the $n^2$ cross-product problem of single flow table implementations, it introduces several problems. In particular, it requires an excessive number of tables for realistic programs, since programmable, multi-table switch chips in the near future are likely to have tens of flow tables while realistic programs will likely have 100s to 1000s of lines of code. Moreover, each instruction's table may require a large number of rules, since this approach uses an exact match against variable values and there is one rule per input store that is observed to occur at the instruction. In this example, tables 1 and 2 will have one rule per MAC address occurring in the input traffic, even if many of the MAC addresses do not occur in the macTable state table and are therefore mapped to the same outcome by L2-Route.

Compact-Mappable Statements

Fortunately, we can improve on the naive, exact match approach described in the previous section by observing that many instructions can have compact encodings using ternary, prioritized matches available in flow tables that require far fewer rules than the preceding generic, naive input-output mapping. For example, the statement L4: srcSw=macTable[s] can be encoded with exactly m+1 rules, where m is the number of entries in macTable: there is one rule for each key in macTable and a final rule for the case where s is not found in macTable. Similarly a statement such as x=srcSw>4 has a compact encoding: if srcSw is represented with k bits, then if any of the k−2 high order bits are set, z is assigned true, else false. Hence we need k−1 rules to implement the instruction on the bits of macSrc, whereas a memo table for this instruction would require one rule per observed macSrc value.

We therefore identify a large set of compact-mappable statements. Each compact-mappable statement is an assignment v=e, where we group the expression e into three categories: state variable table lookup, boolean expression, and flow-table compatible arithmetic. A lookup expression has the form $t[v_1, \ldots, v_n]$ for some system state table t where at least one of $v_i$ is a packet attribute variable (this can be generalized, but for simplicity we keep this form.) Boolean expressions are a conjunction of non-negated or negated simple conditions, which include pattr relop e, $pattr_1=pattr_2$, where pattr, $pattr_1$, $pattr_2$ are packet attributes, e is an expression not involving packet attributes, relop is one of <, ≤, =, >, ≥. Mappable arithmetic expressions include bitmasked fields, e.g. expressions of the form pattr & mask.

Specifically, TableMap (Algorithm 1) maps a subset of compact-mappable state table lookups into flow tables (it can be extended to map other compact-mappable statements similarly). A flow table can simulate the state table lookup by matching the input variables against each of the keys occurring in the table and sets the output according to the value associated with the key (Line 5). However, since some variable-key bindings may not occur at a given lookup program instruction (e.g. in the statements x=1; y-nextHop[macDst,x]; only keys of nextHop whose second component is 1 are needed). Therefore, TableMap filters the keys against the input store (line 4). In the boolean case of testing v=pattr==e, we evaluate both the pattern expression and the right-hand side expression to obtain a match condition and then assign true to v if the match succeeds. In both state table lookups and compact boolean expressions, we include default rules to handle the cases when the table lookup fails and when a boolean test returns false (lines 6 and 10). We use OpenFlow's priority convention that rules with higher priorities take precedence.

Static Dataflow Analysis

While not all table lookups and boolean expressions

---

Algorithm 1 TableMap(I, store)

1:  switch (I.type) do
2:      case v = $t[v_1, \ldots, v_n]$:
3:          for $((x_1, \ldots, x_n), y) \in$ entries(t) do
4:              if $(\{v_1 : x_1, \ldots, v_n : x_n\})$ possible in store then
5:                  Add rule prio: 1, $v_1 : x_1, \ldots, v_n : x_n \mapsto v : y$
6:          Add rule prio: 0 $\mapsto$ v : null
7:      case v = pattrexp == e:
8:          let $v_1, \ldots, v_n$ be inputs(I)
9:          Add rule prio : 1, $v_1 : x_1, \ldots, v_n : x_n$,
              eval(pattrexp, store) : eval(e, store) $\mapsto$ v : true
10:         Add rule prio : 0, $v_1 : x_1, \ldots, v_n : x_n \mapsto$ v : false
11:     end switch

--- in the given input programs are compact-mappable, many of these statements can be transformed into compact-mappable form. Magellan accomplishes this by developing a packet attribute propagation dataflow analysis (a variation on constant propagation) to compute, for each variable and program point, whether the variable is equal to some packet attribute at the given program point. For example, applying the analysis to L2-Route discovers that variable s in line L4 is equivalent to macSrc and that d at L6 is equivalent to macDst and therefore rewrites these two table lookups to be srcSv=macTable [macSrc] and dstSw=macTable [macDst]. This transformation therefore allows both lookups in macTable in L2-Route to be considered as compact-mappable.

Regions: Instruction Aggregation

Although the program contains a set $C=I_1, \ldots, I_c$ of compact-mappable statements, there will be many other instructions that are not non-compact mappable, whose behavior must also be simulated by the forwarding pipeline. As we observed previously, a naive, instruction-level mapping is impractical.

Fortunately, we can improve over instruction-level memoization (or per-instruction flow tables) by observing that our semantic model of instructions extends to blocks of instructions as well. For example, we can model a sequence of instructions $I_1; \ldots; I_n$ modeled by transition functions $\tau_1, \ldots, \tau_n$ with the composed function $\tau_n, \ldots \circ \tau_1 \circ \tau_2 \circ \tau_1 \circ \tau_1$, where we use a helper function $\tau_i$ (store, pc)=store that selects the updated store from the tuple returned by $\tau_i$. We can leverage this to apply the preceding memoization technique to entire regions of non-compact instructions where each region has some unique starting instruction, denoted entry(R), and extends to include all instructions reachable from entry(R) without traversing some specific collection of region exit instructions. We define an algorithmic policy region (or AP region or just region) to consist of an entry instruction and a set of instructions which are not in the region, and we say that the region consists of all dynamic executions of the program starting from the entry instruction up to the first instruction that is not in the region. We note that an AP region may be as small as one instruction or as large as a whole program. We extend our notation of input and output variables to regions. Specifically, inputs(R) is the set of variables that may potentially be used before being written to by instructions in R (similar, but not identical, to the conventional notion of variable liveness. Informally, a variable is live at a program execution point if its value may later be read before it is written to.). By memoizing regions of instructions, we dramatically reduce the number of tables required. We call the regions and the control flow among them, the abstract table graph.

DefineRegions (Alg. 2) provides an algorithm to compute regions. DefineRegions begins by considering each compact-mappable statement to the entry of a region (line 1); in this line C denotes the set of compact-mappable instructions in the AP. We then process the compact-mappable statements in topological order relative to the control flow graph of the program (we address programs with loops subsequently). For each compact-mappable instruction $I_j$, we consider the instructions reachable from $I_j$ without traversing into another region. If adding a considered instruction to the region for $I_j$ would not add a new input variable to the input set of the region, we include the instruction. Otherwise, we mark the instruction as beginning a new region (line 8). This algorithm does not recursively apply this process to the newly discovered region headers, although in general this could be advantageous. To Algorithm 2 DefineRegions( )

```
1:  H = C
2:  for i = 1 ... c do
3:      while true do
4:          let I be the topologically next considered instruction reachable
            from I_i without traversing a region header.
5:          if there does not exist such an I then
6:              break
7:          if including I in region R_i adds new variables to inputs(R_i) then
8:              H = H + {I}
    return H
``` illustrate the algorithm, consider the following AP:

| 1. | x = t1[macSrc] ; |
| 2. | y = x * x; |
| 3. | z = t2[macDst] ; |
| 4. | egress = [y + z] ; |

Figure 8:
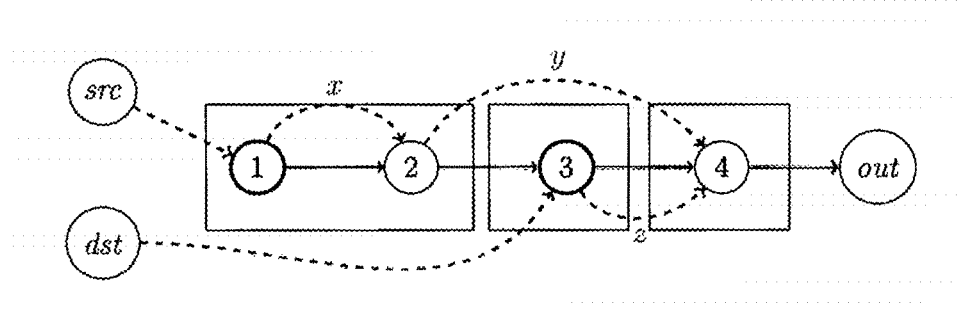
FIG. 8 shows the control and data flow graphs for example program. Each instruction is labeled with its line number; other graph nodes are program inputs or outputs. Control flow is depicted with solid edges while data flow is depicted with dashed edges.

FIG. 8 depicts both the control and dataflow dependencies of this program. DefineRegions starts with H={1, 3} (the thick circles), since these are compact mappable instructions. It processes i=1 first and examines instruction 2. Since the variables in inputs($I_2$)={x} are produced within the region $R_1$, including $I_2$ in $R_1$ does not increase inputs($R_1$) and hence we include $I_2$ in $R_1$. The algorithm then exits the inner loop and processes region $R_2$. The algorithm then examines $I_4$ and since inputs($I_4$)={y, z}, where the value of y is produced outside of the region $R_2$, including $I_4$ in $R_2$ would increase its input set. Hence, $I_4$ is marked as an additional region header (i.e. added to H). The boxes in FIG. 8 indicate the resulting regions computed by our algorithm.

Note that the afore-mentioned definition of regions differs from the traditional compiler notion of basic block. In particular, regions may include instructions that change control flow (unlike basic blocks), may be smaller or larger than basic blocks, and allow overlapping regions, and an individual instruction may belong to more than one region. In particular, this may happen if an instruction is reachable from two region headers before reaching another region header.

Loops

Many important APs contain loops, for example to perform some complex search (e.g. ACLs, contracts). Since forwarding models (e.g. OpenFlow and P4) do not allow cyclic control flow among flow tables, we cannot naively apply our prior techniques to programs with loops.

Fortunately, our region abstraction provides a simple approach to supporting such programs. Specifically, we consider each loop that contains one or more compact-mappable statements to be a single region, whose entry is the loop entry instruction. Note that loops that do not contain compact-mappable statements are handled by the prior techniques with no modification, as they will be incorporated into the above-designed regions.

Magellan first computes the strongly connected components of the control flow graph and forms a graph G=(V, E) where the nodes V consist of the strongly connected components (i.e. sets of instructions) and where (u, v)∈E is an edge whenever an instruction in u has an edge in the original control flow graph to an instruction in v. We then compute regions using a DefineRegions where each strongly connected component is considered as a pseudo-instruction. Since G is acyclic and hence can be topologically ordered.

Specifically, Magellan performs an initial table design using the following approach:

1. Form the strongly connected components (SCC) of the control flow graph (CFG) of the extended 1K.
2. Allocate one table for each simple SCC that consists of a single access instruction and each compound SCC that includes one or more access instructions.
3. For every pair of tables s, t, we obtain the SCC-paths from the start label of s to the start label of t which traverse only SCCs that are not allocated tables.
4. The resulting tables and SCC-paths form the abstract table graph (ATG) for the input program.
5. For each edge of the ATG, a parameterized compound action is computed which simulates the effect of executing the code path along the SCC path.

Figure 9:
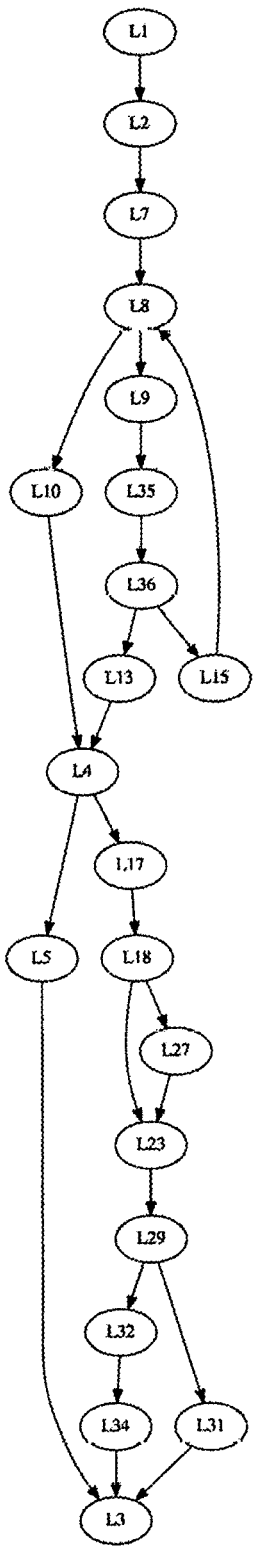
FIG. 9 shows the control flow graph from an example program.
Figure 10:
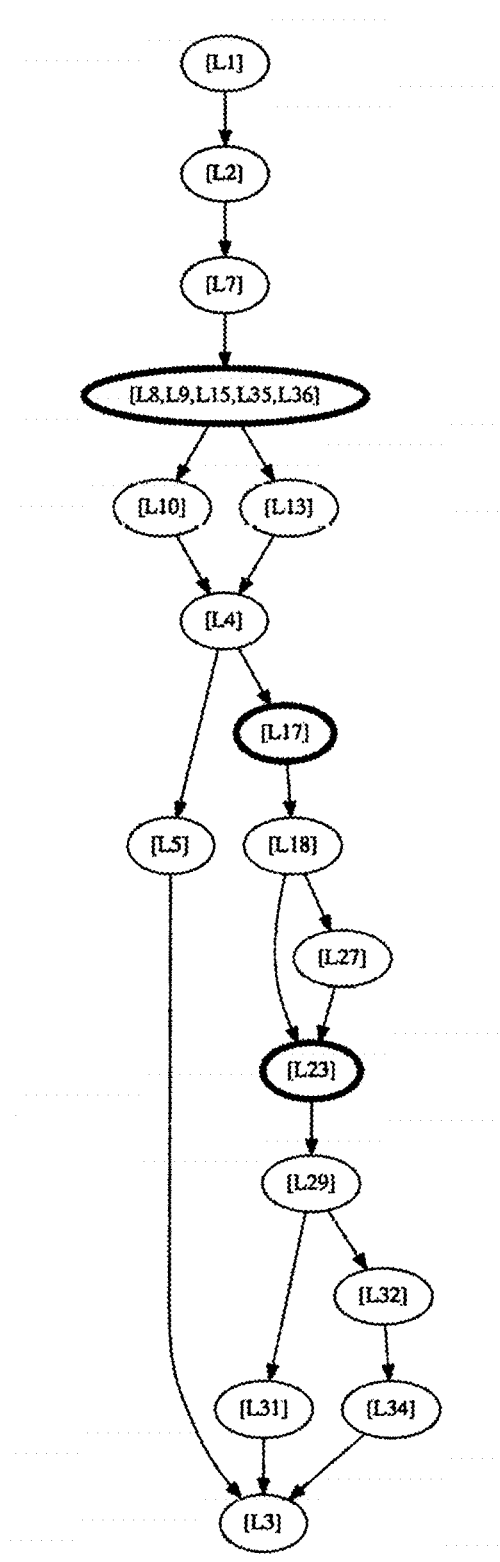
FIG. 10 shows the strongly connected component graph from an example program control flow graph and the regions headers in bold.
Figure 11:
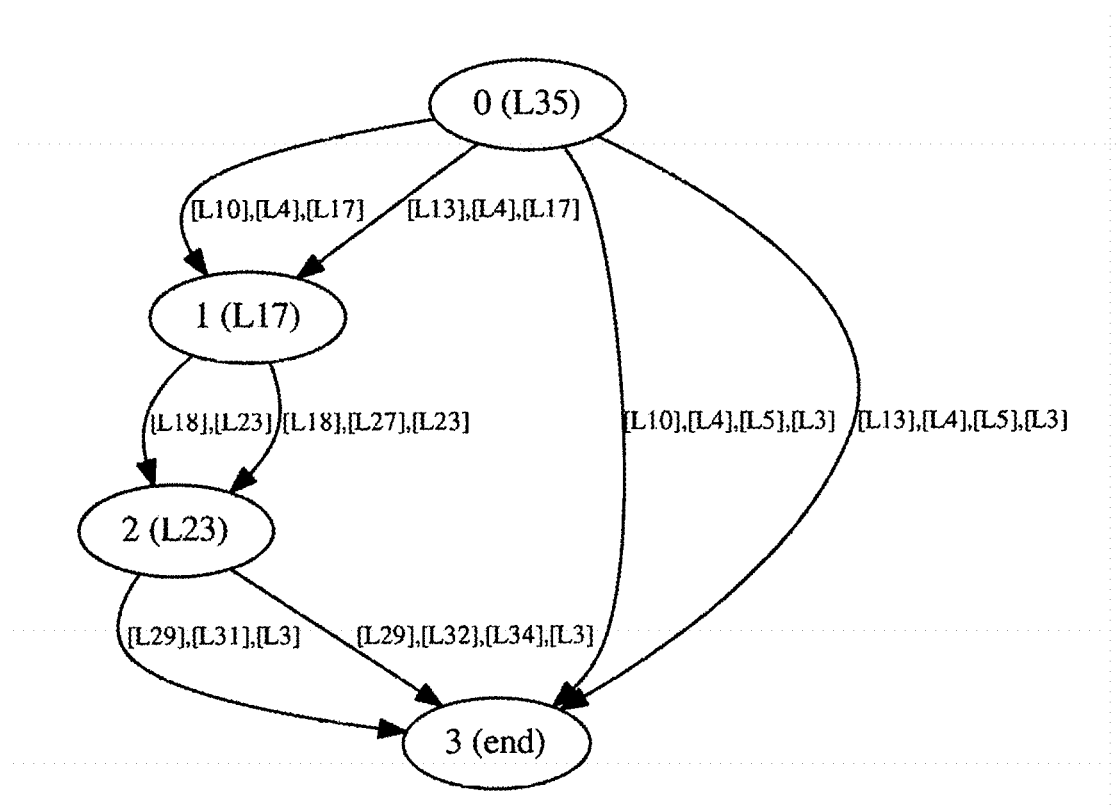
FIG. 11 shows the graph with one graph node per region and each graph edge corresponding to a program path through the strongly connected component graph.
Figure 12:
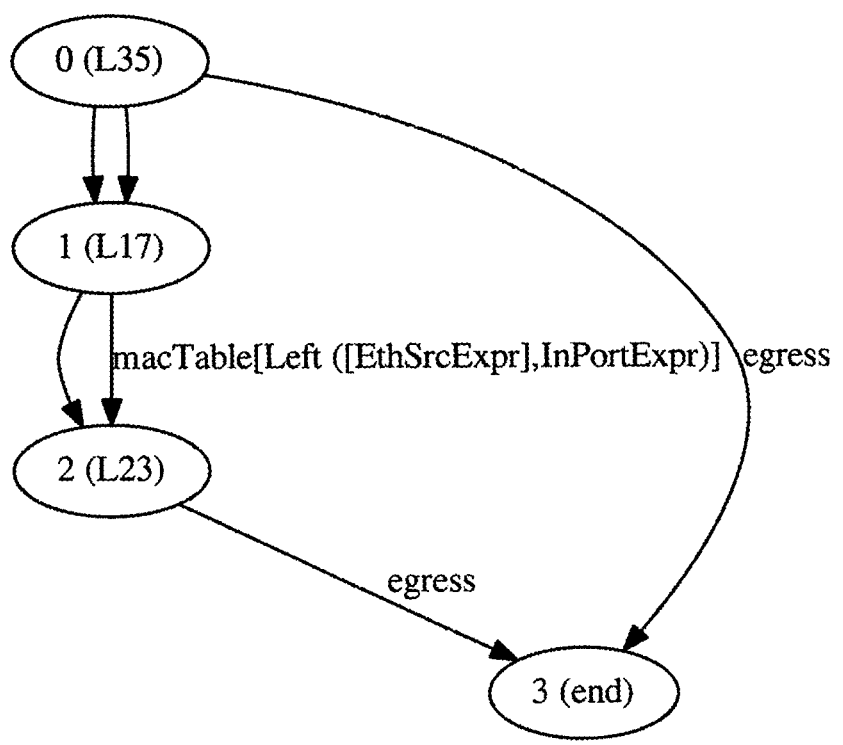
FIG. 12 shows the graph with one graph node per region where each graph edge is annotated with the form of the effect that should occur if execution of the program should traverse the path represented by the graph edge.

Several figures depict the aforementioned process on a sample algorithmic policy. FIG. 9 depicts the aforementioned cyclic control flow graph. FIG. 10 depicts the corresponding strongly-connected control flow DAG, where bold nodes contain access instructions which will be region headers. FIG. 11 is the abstract table graph with SCC-paths labeling edges, while FIG. 12 is the abstract table graph with each edge labeled by an action effect (writes and updates).

Register Allocation & Value Encoding

The number of datapath registers (or packet metadata) is limited in real switching chips and it is important to use few datapath registers. To address this, Magellan adapts a register allocation algorithm from the compiler literature, applying it to a variable interference graph based on the input and output variables of the computed regions, rather than based on the instructions of the original code, as would occur in a traditional compiler.

In addition, most forwarding models, including OpenFlow and P4, do not provided compound data types, such as collections. In order to tabulate regions whose input or output sets include variables that hold collections, Magellan implements runtime value encoding. In particular, at runtime, each unique collection that must be stored in a given variable v is assigned a unique numeric identifier. To generate a rule that matches on (or writes to) a variable v with a given collection, Magellan instead matches on (or writes to) the collection's assigned identifier.

State Updating Instructions

Realistic APs often include state-update instructions. In particular, even the most basic SDN programming example, namely MAC learning switch, performs state updates in order to implement correct behavior:

| 1. | onPacket(p): |
| 2. | macTable[p.macSrc] = p.ingressPort |
| 3. | p = macTable[p.macDst] |
| 4. | if (p == null) { egress=[allPorts]} |
| 5. | else { egress = [p] } |

In this example, the program begins in line 2 by updating the mapping of mac addresses to ports. The program then continues to use this same macTable in line 3 to look up where the destination of the packet resides.

To handle state updates, we extend the computational model to describe the updates performed by an instruction. In particular, we consider the transition function for any instruction I to be $\bar{I}$: Store→(PC, Store, Updates), where Updates denotes the set of sequences of system state variable updates. For example, if I is line 3 of L2Learn, then $\bar{I}$({macSrc:1, inPort:2})=({macSrc:1, inPort:2}, 4, [insert (macTable,[1],2)].

To implement state updates, Magellan modifies a rule that updates state to instead punt the packet to the controller, effectively halting the execution in the pipeline. The controller receives the punted packet, executes it using the given AP, and performs any state updates needed. These updates may lead to updated flow tables so that these packets are not punted again. If asynchronous updates are permitted, Magellan can continue processing the packet, in addition to sending punted packet, allowing the packet to be processed in the current forwarding state, while the controller updates state asynchronously.

P4 Code Generation Some OpenFlow switches, such as Open vSwitch (openvswitch.org), do not require a pipeline setup phase, such as specifying which tables will be needed and the possible control flow among them. Instead, the switch implicitly includes a large set of tables, numbered 0 to NUMTABLES−1 with an implicit control flow graph such that any table can jump to any table with a higher number.

Other switches, such as hardware switches supporting P4 require a setup phase in order to configure hardware pipelines. The setup phase requires as input a P4 program which describes, among other things, the set of tables needed, along with details such as (1) which fields will be matched on and in what fashion (ternary, exact, etc.), (2) what forms of actions will be used by rules in each table (e.g. if there will be a rule in table 1 that writes to registers for z and y then there must be a declared P4 action that writes to z and y; otherwise, such a rule would be invalid at runtime), and (3) the control flow among tables specified as a special P4 control flow program.

Therefore, when directed by a programmer to generate code for a P4 switch, Magellan generates the appropriate P4 code for the pipeline. This code generation makes use of the previously-generated analysis and compilation artifacts to determine various details, such as the packet attributes and matching type for each table, all possible action sequences that may occur between tables, and an appropriate control flow program.

Runtime: Proactive Table Population

While the table designer determines the forwarding pipeline organization, the Magellan runtime system populates and maintains designed flow tables at runtime. The previously described TableMap algorithm in described how we can map a compact-mappable instruction into a flow table given the collection of all stores which can reach the instruction. While a reactive approach to determining these sets is possible, this can substantially damage performance by causing many packet misses. Therefore, Magellan develops a novel exploration technique that computes reachable sets (and flow tables) proactively in most cases. We also extend table mapping to map entire regions, including those with loops, to flow tables.

Region Exploration

Given a fixed, current value of each system state table, an AP is a function with finite inputs and outputs. In principle, we can simply execute the program on all possible input values while instrumenting the execution to observe the stores that can reach each instruction. Unfortunately, the input space is too large, even if we restrict to consider only packet fields used in the program, to make this approach feasible.

Fortunately, we can exploit compact-mappable statements to practically explore all executions of the program without enumerating all inputs. The key observation is that each compact-mappable statement maps some input packet attributes with large ranges (e.g. macSrc) into a small collection of possible outcomes. For boolean compact-mappable instructions, two outcomes are possible, while for system state table lookups, the number of outcomes is the m+1 where m is the number of values in the key-value state table. We consider m to be small, because it is bounded by the size of the system state, rather than the cardinality of packet header space. We say compact-mappable statements have low fan-out.

We can exploit these low fan-out instructions to systematically explore the program by repeatedly executing instructions, starting at the program entry point with an empty store and continuing as follows: if we are executing an instruction whose inputs are derived variables (e.g. not input packet attributes), simply compute the result, update the store and then continue executing at the next instruction. If we are executing a low fan-out instruction, then, for each of the outcomes, we calculate a new store updated with that outcome and then continue exploration at the next instruction with that updated store. Otherwise, we are executing a high fan-out instruction (e.g. read the macSrc attribute) and we retrieve a set of sampled values that have occurred for this instruction in the past, with which to continue executing. In this way, we obtain the set of stores that can reach each instruction.

ExploreRegions applies this exploration idea to each region produced by the Table Designer. It explores each region in topological order, propagating reachability information to subsequent regions as they are reached. For efficiency, each region R is explored once for every distinct set of variable bindings for the variables in inputs(R).

ExploreRegions (Alg. 3) assumes regions $R_1, \ldots, R_n$ are sorted in topological order of control flow. ExploreRegions initializes the reachable set of the first region to consist of a single, empty store and that of other regions are initialized to be empty (lines 1-3). The algorithm then explores each region in all the possible input states (lines 9-10), as computed by ExploreRegions calls on earlier regions. To avoid redundantly exploring a region, we first remove all region-irrelevant variables from each store (line 6) to obtain a restricted store $s_{relevant}$ and only explore a region once per restricted store. Since the region-irrelevant bindings may be relevant in later, the algorithm passes the collection of region-irrelevant bindings to the region exploration procedure (lines 7-8).

Algorithm 3 ExploreRegions ( );

1:  reach[1] = { empty store}
2:  for i = 2 ... n do
3:      reach[i] = ∅
4:  for i = 1 ... n do
5:      for s ∈ reach[i] do
6:          $s_{relevant}$ = restrict(s, inputs($R_i$))
7:          $s_{irrelevant}$ = s − $s_{relevant}$
8:          storeMap[$s_{relevant}$].insert($s_{irrelevant}$)
9:          for ($s_{relevant}$, others) ∈ entries(storeMap) do
10:             ExploreRegion($R_i$, entryPC($R_i$), $s_{relevant}$, others)

ExploreRegion (Alg. 4) explores an individual region R. When the exploration reaches entry(R) of a new region R, it updates the stores reaching R'. Specifically, it extends the current store in all possible ways with bindings for variables that are not in inputs(R) but which are present in stores reaching R, and then removes non-live variables at entry(R) (lines 16). In addition, for each region, it generates a Explorer Graph (EGraph) which records the packet access operations performed for executions in the region in the form of a directed, acyclic graph (DAG). EGmph is conceptually similar to a trace tree developed in the Maple system, in that it records packet accesses to enable flow table compilation. Unlike trace trees, EGraph allows sharing of sub-trees, which can occur whenever distinct executions reach the same store and program counter; in this case, subsequent program behaviors are identical and can therefore by represented by a single graph node.

In particular, ExploreRegion (Alg. 4) constructs an EGraph by identifying nodes by (pc, store) pairs and by recording the outgoing edges from a node in that node's outEdges[ ] array. An EGraph has 5 types of nodes: (1) return nodes, that record the store at a return instruction, (2) map nodes, for compact-mappable instructions, (3) region jump nodes, which indicate that execution jumps to a distinct region, (4) sampling nodes, which correspond to non-compact mappable statements that access some packet held, and (5) execution nodes, which correspond to the execution of non-compact mappable, non-packet access instructions. The algorithm repeatedly executes up to the next break point, where a break point is either a return instruction, a compact-mappable instruction, the first instruction of a distinct region, or an non-compact access to a packet attribute.

Non-Compact Packet Access

As described above, some instructions may read packet attributes whose range of values may be extremely large (e.g. $2^{48}$). For such instructions, we rely on a reactive, sampling approach. For each such instruction, Magellan runtime records the set of values for the packet attribute seen at this program point. To ensure observation, Magellan generates rules for a SampleNode of the EGraph in a way that ensures that any packets having values not observed before are punted (i.e. have packet miss) to the controller, where the sample database is updated. After this set is updated, further flow table modifications may be triggered which suppress further packet misses for packets with this value of the given attribute.

| Algorithm 4 ExploreRegion (R, pc, store, others): |   |
|---|---|
| 1: | ins = prog[PC], nid = (PC, store) |
| 2: | if nid explored already then return |
| 3: | mark nid explored |
| 4: | switch (instruction type) do |
| 5: | case Return: |
| 6: | add ReturnNode(nid, restrict (store, outputs)) |
| 7: | case Map of the form x = e with next pc pc': |
| 8: | add node = MapNode(nid, store) |
| 9: | for each outcome of y of e possible in store do |
| 10: | store' = restrict(store + {x : y}, pc') |
| 11: | nid' = execute at (pc', store') to next break |
| 12: | node.outEdge[y] = nid' |
| 13: | ExploreRegion(R, pc', store', others) |
| 14: | case branch to different region R': |
| 15: | add RegionJumpNode(nid, R') |
| 16: | reach[R'].insert({restrict(extend(store, o), entry(R')) : o ε others}) |
| 17: | case unconstrained access to packet field x = fld: |
| 18: | add node = SampleNode(nid, fld) |
| 19: | pc' is the next PC |
| 20: | for each sampled value y of fld reaching pc do |
| 21: | store' = restrict(store + {x : y} ,pc') |
| 22: | nid' = execute at (pc', store') to next break |
| 23: | node.outEdge[y] = nid' |
| 24: | EXPLOREREGION (R, pc', store', others) |
| 25: | default: |
| 26: | add node = ExecNode(nid, store) |
| 27: | nid' = execute at (pc, store) to next break |
| 28: | let (pc', store') = nid' |
| 29: | node.outEdge[ ] = nid' |
| 30: | EXPLOREREGION(R, pc', store', others) |
| 31: | end switch |

Region Table Mapping

Given the reachable stores reach[R] and the EGraph $G_R$ for every region R, RegionMap (Alg. 5) maps the overall program into flow tables. For each region R, the algorithm determines each of the R-relevant stores, then compiles $G_R$ at each such store (line 3), and then adds the resulting rules to the table for region R (line 4).

| Algorithm 5 RegionMap(R): |   |
|---|---|
| 1: | let pc = entry(R) |
| 2: | for s ∈ {restrict(s' , pc) : s' ∈ reach[R]} do |
| 3: | rules =CompileGraph($C_R$, pc, s) |
| 4: | Table[R].add(rules) |

CompileGraph (Alg. 6) then compiles each $G_R$ into a single table of rules. The algorithm traverses $G_R$ recursively starting with the root, mapping each EGraph-node into a logical flow table using the TableMap. If a resulting rule terminates flow processing or if it jumps to another region (line 5), the recursion terminates and the rule is added to the output collection of rules' (line 6). Otherwise, if a resulting rule jumps to another node within GCR (line 7), the algorithm determines the store' that results from performing the action of the rule (line 8), continues to compile the target of the jump (line 9) and then inlines the resulting logical flow table into the current rule. This inlining is required because CompileGraph must generate a single logical flow table for the entire region. Note that in combining parent and child rules Inline eliminates all combinations that have empty intersections and therefore would never be activated.

As written, CompileGraph may redundantly compile a node multiple times. This is easily eliminated by memoizing the compilation results as they are determined:

| Algorithm 6 CompileGraph($G_R$, pc, store): |   |
|---|---|
| 1: | let rules = TABLEMAP(pc, store) |
| 2: | let rules' = ∅ |
| 3: | for r ∈ rules do |
| 4: | pc' = r.jumpsTo |
| 5: | if (pc' = entry(R'), R ≠ R') ∨ (pc' = null) then |
| 6: | rules'.add(r) |
| 7: | else |
| 8: | store' = restrict(perform(store,r.regWrites),pc') |
| 9: | childRules = CompileGraph($G_R$, pc', store') |
| 10: | for r' ∈ Inline(r, childRules) do |
| 11: | rules'.add(r') |
| 12: | return rules' | for each node, after compiling the flow table for the sub-graph rooted at the node, we store the result into a memo table indexed on node identifier. In addition, upon entering CompileGraph, we return the result stored in memo table, if any exists, and otherwise compile.

Overall Runtime Operation

We now summarize how the Magellan runtime operates a single switch. Once a switch starts and connects with the Magellan runtime, the runtime configures the switch resources (tables, action groups, etc.; omitted for switches not needing this), loads the system state tables stored in persistent storage, performs an initial exploration and region flow table mapping with the current state tables, and pushes flow tables to the switch. Some of the generated rules' actions produce notifications or punted packets for either state updates or to implement reactive packet sampling. Upon receiving these events, the runtime either performs the requested updates and may execute the AP on the given packet. As a result, the system state tables may be updated and a new exploration, flow table compilation, and switch update may be triggered.

Evaluations

In this section, we demonstrate that Magellan (a) can match the designs of human SDN experts on a real world example; (b) improves end-to-end performance over existing systems; and (c) scales rule compilation to networks with hundreds of thousands of endpoints. Our evaluations use our prototype, which consists of 9500 lines of Haskell and includes an OpenFlow 1.3 message layer and controller and a P4 code generator and runtime interface to a reference P4 switch target.

Real World Policy Compilation Quality

We apply Magellan to Group-based policy (GBP) We use the GBP AP previously specified and compare the GBP authors' published multi-table design with automatically derived tables from Magellan.

GBP Flow Tables:

FIG. 13 illustrates the key flow tables used by GBP. The first table matches on macSrc and (1) writes the source group to register 1 and (2) ensures mac learning by only having entries for learned (host, port) associations and otherwise punting. Table 2 matches on macDst and writes the destination group into register 2 and the outgoing port in register 3. Any destinations which are either not part of a group or whose out port is unknown are dropped by the final rule in table 2. Finally, table 3 matches on all combinations of source and destination groups using matches on registers 1 and 2. In addition, each rule matches on transport ports in order to constrain the forwarding behavior to the specific traffic class of GBP rule. If a packet is permitted at this point, it is forwarded to the appropriate port using the value stored in register 3; otherwise it is dropped.

Magellan Flow Tables

The flow tables produced by Magellan are identical with the following exceptions: (1) table 2 does not write to a register 3 for the output port, (2) table 3 jumps to an extra final table 4 that matches on macDst and forwards to a particular port. While Magellan uses one extra table, Magellan achieves linear scaling of rules by hosts and groups as does GBP's design.

End-to-End Performance Benefit

Magellan proactively generates compact forwarding rule sets and thereby eliminates many flow table cache misses and allows switches to handle more traffic locally.

Control Systems:

We compare Magellan with a range of state-of-the-art commercial and academic SDN systems, including Open-Daylight (ODL) (Helium release), Floodlight (www.project-floodlight.org/floodlight/) (version 1.0), POX (openflow.stanford.edu/display/ONL/POX+Wiki). (module forwarding.12_learning from 0.2.0), Pyretic (C. Monsanto, J. Reich, N. Foster, J. Rexford, and D. Walker. Composing software-defined networks. In Proceedings of the 10th USENIX Conference on Networked Systems Design and Implementation, NSDI 2013, pages 1â.ÅŞ14, Berkeley, Calif., USA, 2013. USENIX Association.) (latest version obtained from frenetic-lang.org/pyretic/), and Maple (version 0.10.0). POX, Pyretic and Maple are academic systems supporting novel policy languages and compilers, while ODL and Floodlight are open source controllers that form the basis of several commercial control systems. We run controllers on a 2.9 GHz Intel dual core processor with 16 GB 1600 MHz DDR3 memory with Darwin Kernel Version 14.0.0, Java version 1.7.0_51 with Oracle HotSpot 64-Bit Server VM, and Python 2.7.6.

Network:

We evaluate all systems using Open vSwitch (OVS) version 2.0.2, which supports both OpenFlow 1.0 (required by many controllers) and OpenFlow 1.3.4, used by Magellan. We vary the number of hosts attached to a switch, with each host attached to a distinct port.

Workload:

We evaluate a policy that is available in each system from the system's authors (with minor variations), namely L2 learning and routing. After allowing appropriate initialization of hosts and controller, we then perform an all-to-ping among the hosts, recording the RTT of each ping and measure the time for all hosts to complete this task. After completing the task, we retrieve and count all Openflow rules installed in the switch.

Figure 15:
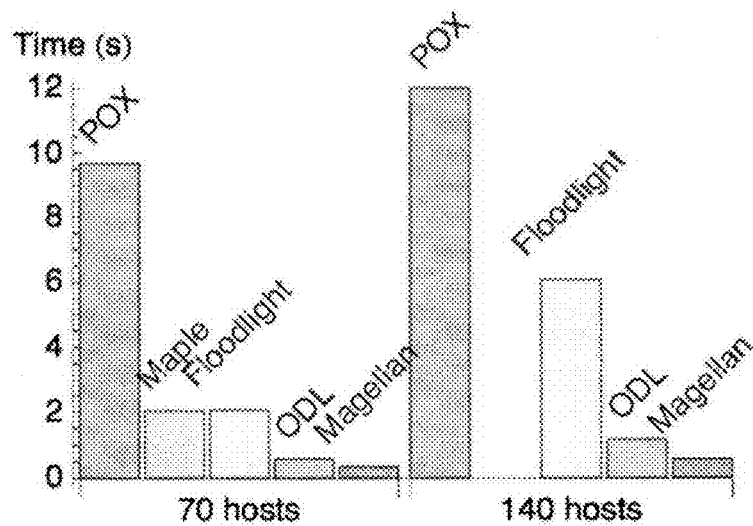
FIG. 15 shows a comparison of median ping round-trip time (RTT) in SDN system when performing an all-to-all ping task.
Figure 16:
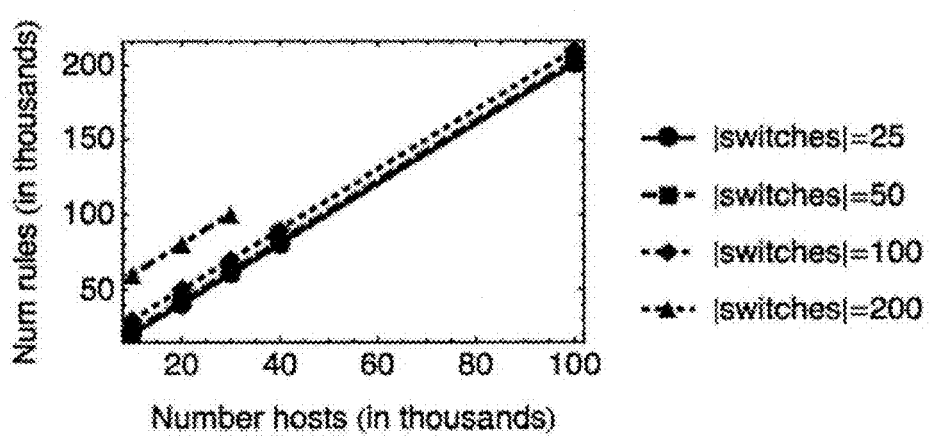
FIG. 16 shows the number of rules generated by Magellan for L2-route for different numbers of hosts and attachment points.
Figure 17:
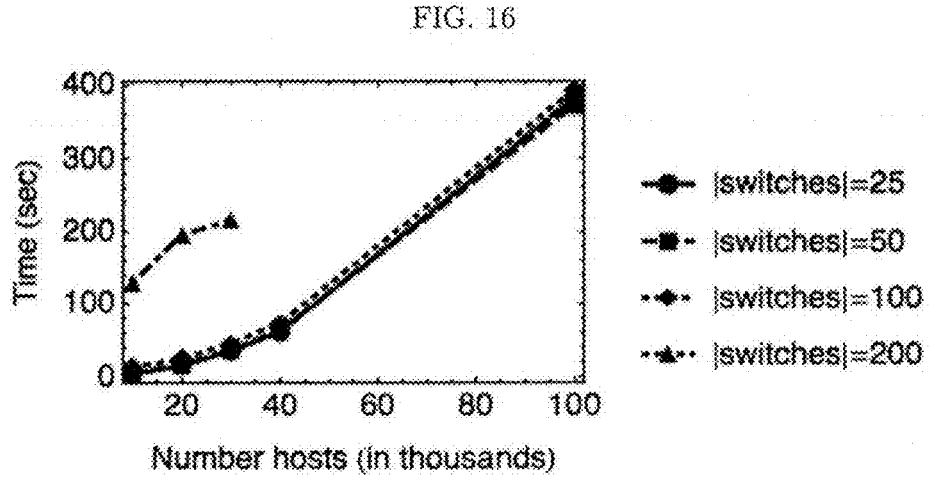
FIG. 17 shows cold start time: time needed to generate rules for L2-route for different numbers of hosts and attachment points.

Results:

FIG. 14 lists the number of rules, task completion time, and median ping RTT for each system with H=70 and H=140 hosts and FIG. 15 charts the median ping RTTs[1]. We observe that for 70 hosts, Magellan uses 33× fewer rules than Maple, ODL and Floodlight, while for 140 hosts, Magellan uses between 46-68× fewer rules than other systems. This rule compression is due to leveraging multi-table pipelines. Other systems generate rules into a single table, and therefore generate approximately $H^2$ rules, while Magellan generates approximately 2*H rules.

[1]Tests of Maple at 140 hosts and of Pyretic at both 70 and 140 hosts failed and these measurements are therefore omitted.

We also observe that Magellan completes the all-to-all ping task 1.2× faster than ODL and 1.4-1.6× faster than Floodlight. Moreover, the median RTT is substantially improved, with Magellan reducing RTT experienced by hosts by 2× versus ODL and between 7× and 10× for Floodlight. This improvement is due to Magellan's proactive rule compilation which generates all rules early in the task—as soon as host locations are learned. In contrast, all other controllers (except Pyretic) generate rules only when a sender sends a first packet to a receiver, and hence other systems continually incur flow table misses throughout the task.

Scalability

The benefits of proactive, compact multi-table compilation may be lost if Magellan's algorithms take too much time. We now evaluate scalability and performance.

Workload:

We apply Magellan to L2-Route. We vary the number of hosts, H, from 10,000 to 100,000 and the number of switches from 25 to 100. We measure number of rules generated and time to generate these rules when starting from cold start: the system state is initialized and then program analysis and rule compilation is started.

Results:

FIG. shows the number of rules generated as a function of the number of hosts in the system for 25, 50, 100, and 200 switches. We observe that the number of rules grows linearly with the number of hosts, due to the three table compilation result that leverages two tables to extract location information from source and destination addresses into registers and then a final table based on registers, which remains invariant (for a particular number of switches) as the number of hosts varies. FIG. shows the amount of time required to compile rules. We observe that Magellan requires under 4 seconds to compile rules for a network of 10,000 hosts and 25 switches and 6.5 minutes to compile rules for a network of 100,000 hosts and 200 switches.

It will thus be seen that the objects set forth above, among those made apparent from the preceding description, are efficiently attained and, because certain changes may be made in carrying out the above method and in the construction(s) set forth without departing from the spirit and scope of the disclosure, it is intended that all matter contained in the above description and shown in the accompanying drawings shall be interpreted as illustrative and not in a limiting sense.

It is also to be understood that the following claims are intended to cover all of the generic and specific features of the disclosure herein described and all statements of the scope of the disclosure which, as a matter of language, might be said to fall therebetween.

What is claimed:

1. A method of implementing packet-processing systems whose input-output behavior is described with an algorithmic policy (AP), comprising the following steps:

defining, by a user, an AP program implementing a packet-processing function, wherein the AP program is written in a Turing-complete and datapath-oblivious language having no specialized datapath operations comprising flow table lookups and flow table updates, and wherein the program supports complex data structures, has per-packet-scoped variables and has inter-packet state variables;

performing, by a compiler, the steps of:
translating the AP program into a linear intermediate representation (IR) consisting of conditional and unconditional lump instructions, read and write instructions on input, output, per-packet-scoped and inter-packet state variables, and arithmetic instructions, the linear IR having no declarations of table pipeline design and no flow table operations;
identifying a plurality of compact-mappable statements in the IR, where each compact-mappable statement falls into one of three categories consisting of: a state variable table lookup, a Boolean expression, and flow table-compatible arithmetic;
analyzing the linear IR to identify a set of regions, the identifying including, for each region, selecting a region entry instruction that begins the region, wherein each region consists of the instructions starting from the region's entry instruction without traversing another region's entry instruction, and the selections are based on the identified compact-mappable statements and ensure that no possible execution of the linear IR can result in a region entry instruction being executed more than once;
assigning a datapath resister to each per packet-scoped variable in the linear IR; and producing a synthesized table pipeline design comprising definitions of multiple flow tables and control flow amongst the multiple flow tables, wherein there is a respective flow table produced for each region and the match attributes for a region's flow table consist of the packet attributes in the inputs of the region and the datapath registers in the inputs of the region;

performing, by a runtime controller, the steps of:
receiving the synthesized table pipeline design and the AP program;
establishing a communication session with a datapath component using a target-specific protocol;
storing current values for state variables of the AP program, wherein the current values are continuously updated as the datapath component processes packets;
initially, and in response to changes in the values of state variables and in response to observations of packet arrivals at the specific datapath component, populating the multiple flow tables with rule entries based on the stored current values, wherein the entries for each region's flow table simulate the effect of some or all possible executions of the instructions of the region, wherein for each flow table entry and each possible packet attribute that can be processed by that flow table entry, there is at least one possible execution of the region in which at the start of execution of the region entry instruction the values of the region's input variables equal the values of the packet's input attributes; and
in response to the populating, translating the populated flow tables of the synthesized table pipeline design into a target-specific table design for the datapath component and configuring the data path component with the translated table design; and
processing packets via the datapath component in accordance with the rules of the translated table design, wherein the datapath component processes packets with the same outcomes as would be computed by the AP program if executed on the packet with the state variables taking their current values.

2. The method of claim 1, wherein during the production of the synthesized table pipeline design the compiler performs a dataflow analysis on the linear IR and selects region entry points using a method which minimizes the maximum number of input variables of any region.

3. The method of claim 2, wherein the method which minimizes the number of region input variables comprises preventing a considered instruction from being added to an existing region by selecting the considered instruction to be a region entry instruction in response to determining that the considered instruction would add a new input variable to the existing region.

4. The method of claim 1, wherein during the production of the synthesized table pipeline design the compiler selects regions using Algorithm 2 (DefineRegions).

5. The method of claim 1, further comprising performing, by the compiler, prior to the identification of compact-mappable statements, a packet attribute propagation dataflow analysis and transformation which detects opportunities in which a per-packet program variable can be replaced with an input packet variable while preserving functional equivalence of the AP programs, wherein performing the replacement transforms one or more statements that are not in one of the three categories of compact-mappable statements into statements that fall into one of the three categories.

6. The method of claim 1, wherein identifying the set of regions comprises computing the strongly connected components of the control flow graph of the intermediate representation, and the region entry instructions are selected from among those instructions for which there exists at least one execution which reaches the instruction and in which the immediately preceding instruction belongs to a different strongly connected component.

7. The method of claim 1, wherein the compiler applies a register allocation algorithm to assign a datapath register to each per-packet-scoped variable in the linear IR.

8. The method of claim 1, wherein the populating further comprises mapping, for each region executions that updates one or more state variables, the execution to a particular flow table entry in the flow table for the region, where the particular flow table entry causes the datapath component to sends such packets to the runtime controller, and, upon receiving such packets, the runtime controller executes the linear IR on the received packets and performs the corresponding updates to the one or more state variables.

9. The method of claim 1, wherein the populating further comprises enumerating all possible executions of each region with the current values of all state variables and populates each region's flow tables with entries that simulate the enumerated executions.

10. The method of claim 1, wherein the populating further comprises enumerating all possible executions of each region with the current values of all state variables, where enumerating a compact-mappable statement is performed by enumerating the possible outcomes of the compact-mappable statement with the current values of state variables, without enumerating the possible values of any input packet variables referenced in the compact-mappable statement, and populates each region's flow tables with entries that simulate the enumerated executions.

11. The method of claim 10, wherein the runtime controller enumerates executions by applying Algorithm 3 (ExploreRegions) and Algorithm 4 (ExploreRegion).

12. The method of claim 9, wherein for an instruction of the linear IR that reads an input packet variable, the runtime controller maintains a sample of values stored in the input packet variable during executions of the instruction at the runtime controller; and further enumerates executions of the instruction by enumerating the values in the sample of values.

13. The method of claim 12, wherein the runtime controller populates the flow table for a region that contains an instruction whose executions are enumerated by enumerating sampled values, with flow entries that ensure that packets that arrive at the datapath component and which would execute the instruction in the linear IR in the current value of state variables, and which have a values for input packet attributes that are not in the sampled set for the instruction, are sent to the runtime controller.

* * * * *